US005964184A

United States Patent [19]
Hart

[11] Patent Number: 5,964,184
[45] Date of Patent: Oct. 12, 1999

[54] CONTINUOUS OPERATING DISTRIBUTION HOPPER

[75] Inventor: John F. Hart, Holland, Mich.

[73] Assignee: Big Dutchman, Inc., Holland, Mich.

[21] Appl. No.: 09/054,101

[22] Filed: Apr. 2, 1998

[51] Int. Cl.[6] .......................... A01K 5/02; A01K 39/012; G01F 11/20
[52] U.S. Cl. .................. 119/57.1; 222/236; 222/410
[58] Field of Search ................... 119/57.1, 57.2, 119/57.3, 57.4; 222/231, 233, 235, 236, 237, 238, 240, 410, 411, 415

[56] References Cited

U.S. PATENT DOCUMENTS

| | | | |
|---|---|---|---|
| 1,071,482 | 8/1913 | Umholtz | 222/238 |
| 1,812,911 | 7/1931 | Walter | 222/231 |
| 1,960,778 | 5/1934 | Goss et al. | 222/231 |
| 2,589,706 | 3/1952 | Kitson et al. | 119/52 |
| 2,738,765 | 3/1956 | Hart | 119/52 |
| 2,754,801 | 7/1956 | Reese | 119/52 |
| 3,123,048 | 3/1964 | Cordis | 119/52 |
| 3,272,400 | 9/1966 | Van Huis | 222/318 |
| 3,292,586 | 12/1966 | Rigterink | 119/52 |
| 3,368,529 | 2/1968 | Ferris | 119/51.11 |
| 3,444,986 | 5/1969 | Van Huis | 198/56 |
| 3,468,519 | 9/1969 | Lorenzen | 119/57.1 X |
| 4,207,995 | 6/1980 | Neely | 222/231 |
| 4,380,214 | 4/1983 | Williams | 119/51 |
| 4,667,623 | 5/1987 | Swartzendruber | 119/52 |
| 4,850,307 | 7/1989 | Sheets | 119/57.2 |
| 4,953,505 | 9/1990 | Lia | 119/57.2 |
| 5,335,619 | 8/1994 | Pollock | 119/57.4 |
| 5,474,027 | 12/1995 | Pollock | 119/57.4 |

FOREIGN PATENT DOCUMENTS 006008  9/1982  European Pat. Off. .

Primary Examiner—Michael J. Carone
Assistant Examiner—James S. Bergin
Attorney, Agent, or Firm—Price, Heneveld, Cooper, DeWitt & Litton

[57] ABSTRACT

A continuously operating reciprocating hopper for continuously supplying feed to an automated feed distribution apparatus of the type having a continuous conveyor which movably traverses through a trough comprises a hopper bin for receiving a supply of feed for distribution wherein a bottom of the hopper bin defines a feed discharge opening. The hopper bin is shaped to direct the supplied feed to the feed discharge opening for delivery of the feed to the feed distribution system. An impeller is rotatably mounted within the hopper bin proximate to the discharge opening. The impeller includes a plurality of blades. A drive rotates the impeller about an axis of rotation in such a manner so that the impeller operates to displace feed away from the discharge area for the prevention of feed compacting in the trough housing.

26 Claims, 3 Drawing Sheets

CONTINUOUS OPERATING DISTRIBUTION HOPPER

BACKGROUND OF THE INVENTION

The present invention relates to animal or poultry feeding systems, and in particular to a hopper for supplying feed to a conveyor system delivering feed to animal or poultry feeding stations therealong.

Animal and poultry feeding systems are well-known in the art. Bulk feed stock in these systems is delivered to a hopper to supply the feeding system. From the hopper, the feed is directed in a metering fashion onto an endless conveyor which distributes the feed throughout the area occupied by the animals or poultry. The feed is distributed along a feeding trough or to a predetermined number of feeding stations. Typically, the feed is conveyed by means of a linked chain conveyor in a feed conveyor trough extending throughout the feeding area. Feed is deposited from the conveyor into individual feeding units along the conveyor system.

A problem with present feeding systems is experienced when the conveyor trough becomes filled with feed and the feed is carried back to the supply hopper. The feed supply in the hopper is gravitationally forced into the conveyor trough. The continued gravitational supply of feed to the conveyor trough in combination with the feed returned by the conveyor results in an oversupply of feed to the conveyor trough. The excess feed causes buildup and compacting of feed within the hopper causing the conveyor trough to jam and overflow. Additionally, the feed at the bottom of the hopper can also become compacted and is then resistant to flow once the conveyor trough has been unjammed.

Such jamming and compacting of feed in the feed distribution system causes disruption in the animal or poultry feeding schedule requiring alternate feeding methods to be implemented until the automatic feeding system is unblocked.

SUMMARY OF THE INVENTION

One aspect of the present invention is a continuously operating distribution hopper for continuously supplying feed to an automated feed distribution apparatus of the type having a continuous conveyor which movably traverses through a trough. The hopper comprises a hopper bin for receiving a supply of feed for distribution wherein a bottom of the hopper bin defines a feed discharge opening therein. The hopper bin is shaped to direct the supplied feed to the feed discharge opening for delivery of the feed to the feed distribution system.

An impeller is rotatably mounted within the hopper bin proximate to the discharge opening. The impeller includes a plurality of blades and a drive rotates the impeller about an axis of rotation in such a manner so that the impeller operates to displace feed away from the discharge area for the prevention of feed compacting in the trough housing.

These and other features, advantages and objects of the present invention will be further understood and appreciated by those skilled in the art by reference to the following specification, claims and appended drawings.

DETAILED DESCRIPTION OF PREFERRED EMBODIMENT

Figure 3:
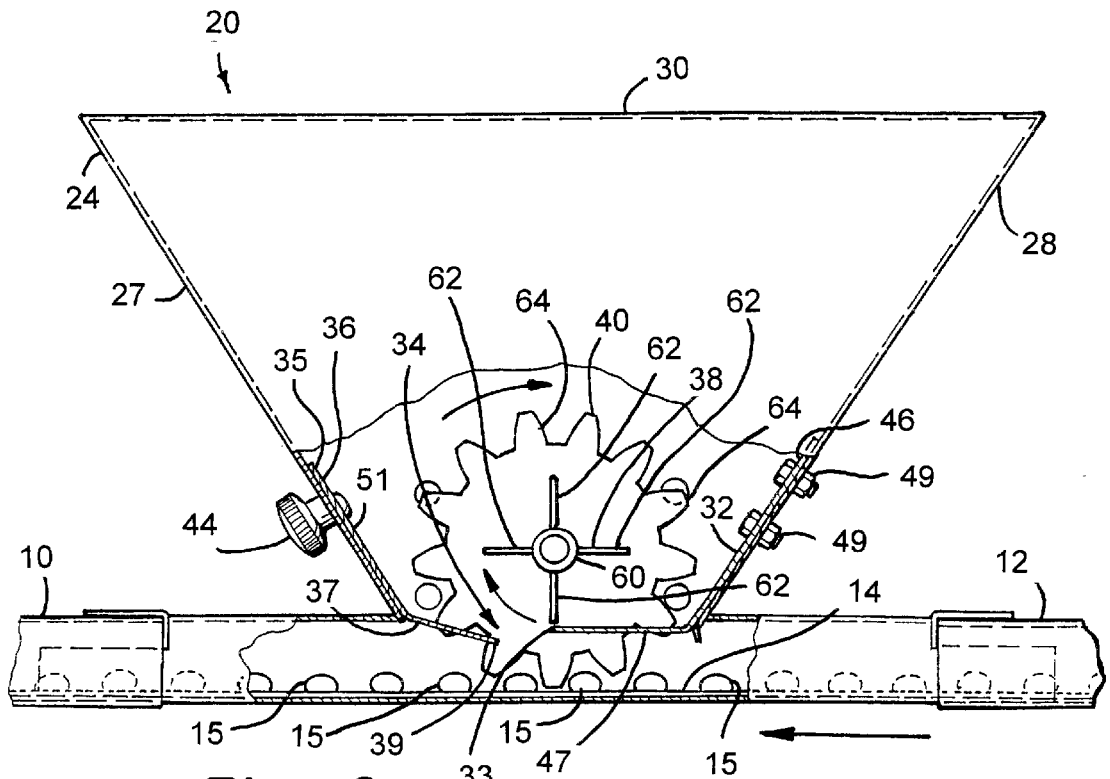
FIG 3 is a front elevational view in partial section showing an impeller according to the preferred embodiment rotatably mounted within the hopper and shown in relationship to a feed distribution system.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
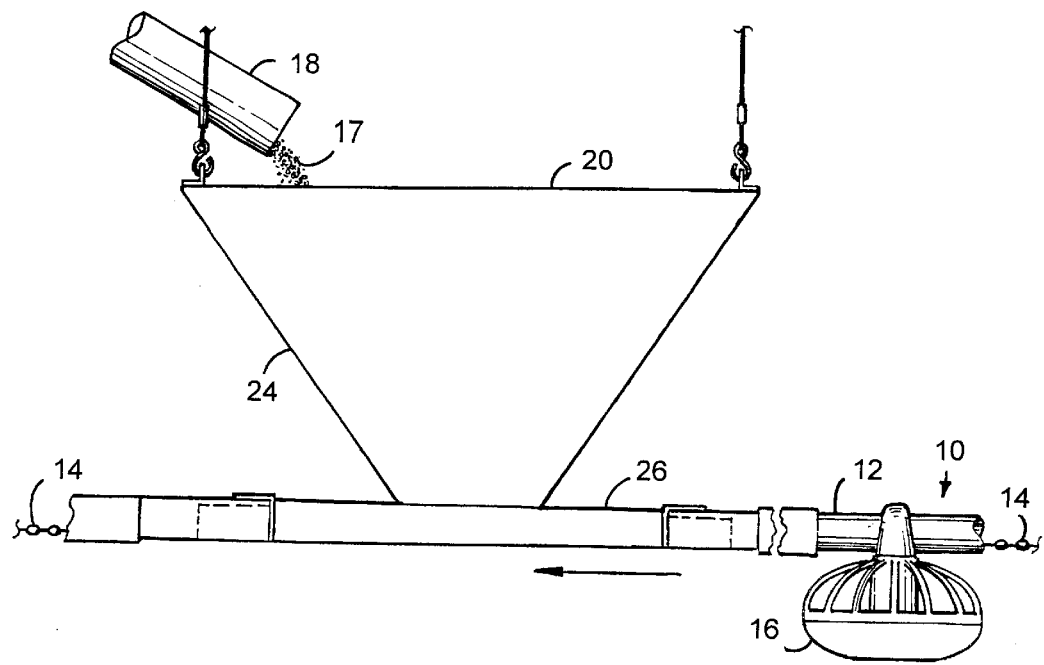
FIG. 1 is an elevational view of a continuous operating distribution hopper embodying the present invention in conjunction with a feed distribution system.

Turning to the drawings, FIG. 1 shows an automated feed distribution apparatus 10 generally comprising a trough housing 12 within which a conveyor 14 (FIG. 3) traverses to deliver feed to individual feeding stations 16. A continuously operating distribution hopper 20 which is one of the preferred embodiments of the present invention, is shown in relationship to automated feed distribution apparatus 10 wherein hopper 20 delivers feed in a continuously metered fashion to apparatus 10. Feed 17 is supplied to hopper 20 by bulk feed supply 18. Hopper 20 includes a hopper bin 24 which is positioned above and affixed to trough housing 12. In the preferred embodiment, a trough section 26 is permanently affixed to the bottom of hopper bin 24, and the ends of trough section 26 are fastened in linear alignment with trough housing 12 such that conveyor 14 moves through the combined trough housing 12 and trough section 26 for the delivery of feed as described herein.

Figure 2:
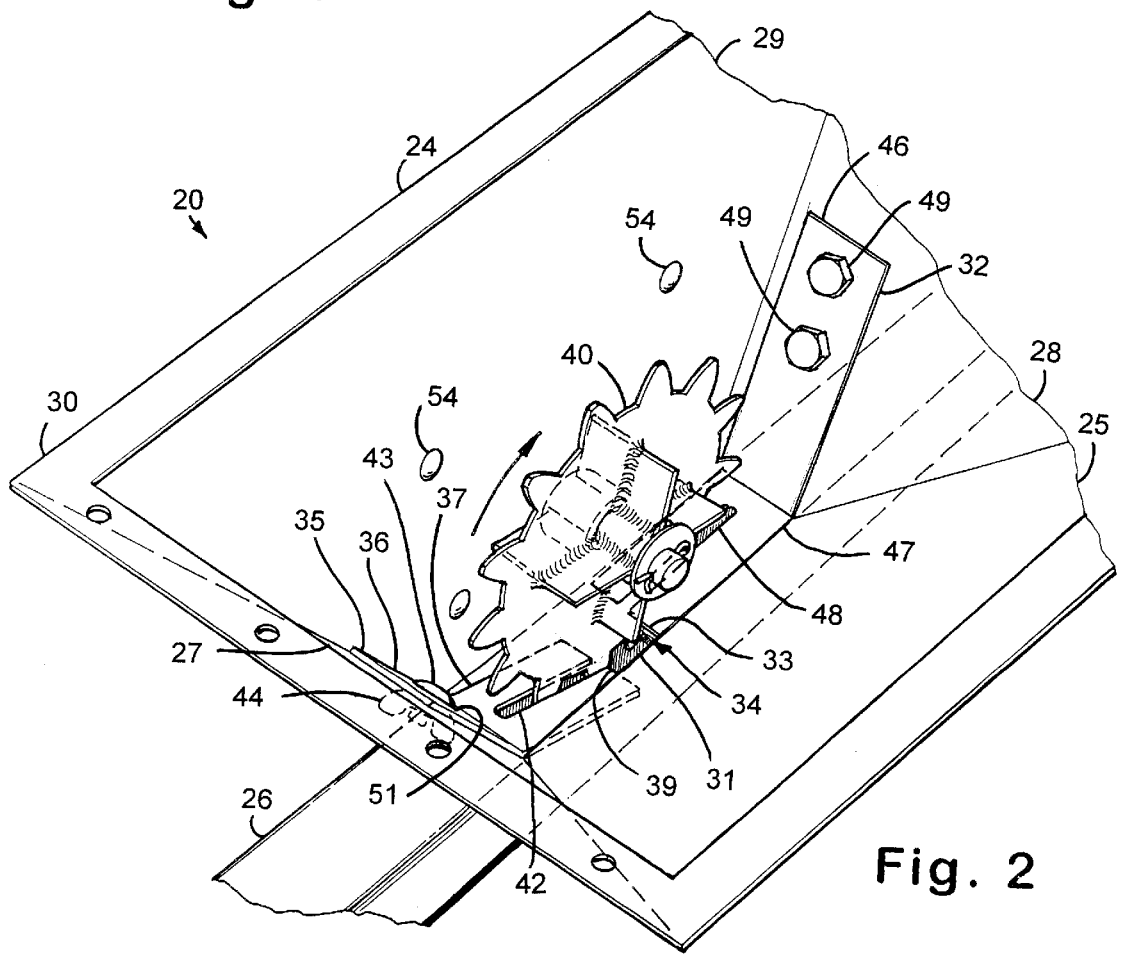
FIG. 2 is a perspective view of the interior of the hopper shown in FIG. 1, further showing an impeller rotatably mounted within the hopper.
Figure 4:
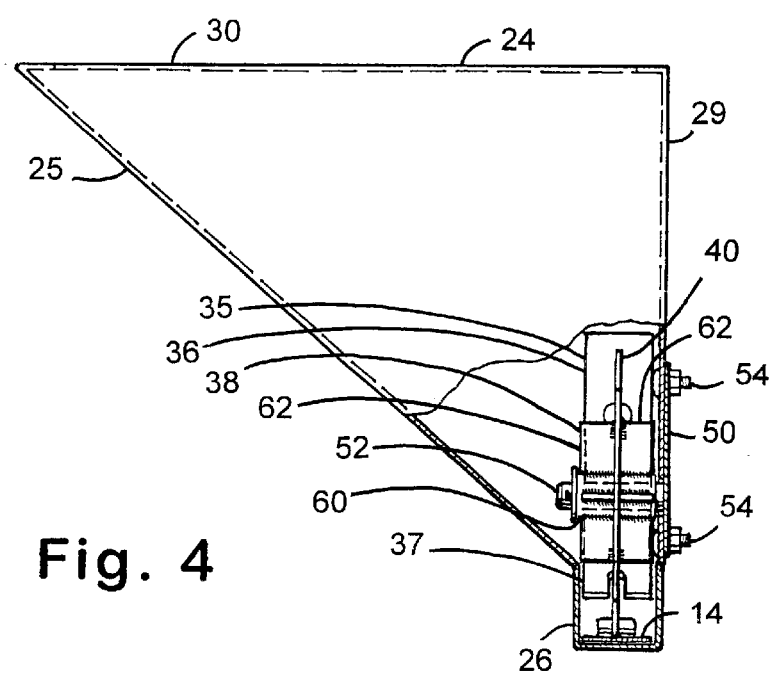
FIG. 4 is an elevational view in partial section of the hopper and impeller shown in FIG. 3.

Referring to FIGS. 2–4, hopper bin 24 has a sloped front 25, left and right sloped sides 27 and 28, respectively, and a back 29 which is substantially vertical. The sides are arranged such that feed 17 introduced through a top 30 of bin 24 is directed downwardly to an open bottom 31 of bin 24. Open bottom 31 is defined by the bottom edges of sides 25, 27, 28, and 29 of hopper bin 24. The width of open bottom 31 is generally defined by the width of bottom edges of left and right sides 27 and 28, and substantially corresponds to the width of trough section 26 affixed to the bottom of hopper bin 24.

A shield 32 has a first leg 46 and a second leg 47 forming an obtuse included angle. Leg 46 is attached to an interior face of right side 28 of bin 24 utilizing removable fasteners 49 such that second leg 47 is maintained in a horizontal position generally at the plane defined by the bottom edges of sides 25, 27, 28, and 29. The width of second leg 47 is substantially identical to the width of open bottom 31 such that second leg 47 closely fits between the bottom edges of front 25 and back 29. Second leg 47 extends away from the bottom edge of right side 28 in cantilevered fashion and has a free edge 33 which corresponds generally to the midpoint between the bottom edges of right and left sides 27 and 28. Second leg 47 has a slot 48 which longitudinally extends from free edge 33 toward the bottom edge of right side 28. The length of slot 48 and the width thereof are of an appropriate size to receive therethrough at least a portion of sprocket 40 as discussed below.

An adjustable gate 35 has a first leg 36 which is attached to and lies along an inner surface of left side 27 of bin 24. Gate 35 also has a second leg 37 at an obtuse angle to leg 36 and whose width is slightly smaller than the width of open bottom 31. The obtuse angle formed by legs 36 and 37 is such that second leg 37 extends angularly downward and to the right from the bottom edge of left side 27 into trough section 26 in a cantilevered fashion such that free edge 39 of gate 35 is vertically disposed below free edge 33 of shield 32. Adjustable gate 35 is attached to left side 27 with a removable fastener 43 wherein removable fastener 43 includes an adjustable knob 44 to permit repositioning adjustable gate 35. When adjustable knob 44 is loosened, adjustable gate 35 may be raised or lowered as defined by slot 51 in left side 27 such that free edge 39 can be fixed in a predetermined desired position with respect to free edge 33 of shield 32 and with respect to trough section 26. Second leg 37 also has a longitudinal slot 42 extending leftwardly from free edge 39 to receive sprocket 40 therein.

Free edges 33 and 39 define in combination with a portion of the bottom edges of front 25 and back 29 of bin 24 a discharge opening 34. Adjustable gate 35 can be adjusted along an angular plane corresponding to the plane of left side 27 wherein the adjusting of gate 35 varies the size of discharge opening 34 for regulating the flow rate of feed 17 through discharge opening 34 into trough section 26. The repositioning of gate 35 and correspondingly the vertical position of free edge 39 also functions to regulate the depth of feed carried along conveyor 14 from trough section 26. Shield 32 and gate 36 can be reversed to facilitate conveyor 14 operating in an opposite direction.

As shown in FIG. 4, a mount plate 50 having a horizontally protruding shaft 52 attached thereto is mounted to vertical side 29 of hopper bin 24. Shaft 52 extends through side 29 to an interior portion of hopper bin 24. Mount plate 50 is fastened to vertical side 29 with fasteners 54.

Figure 5:
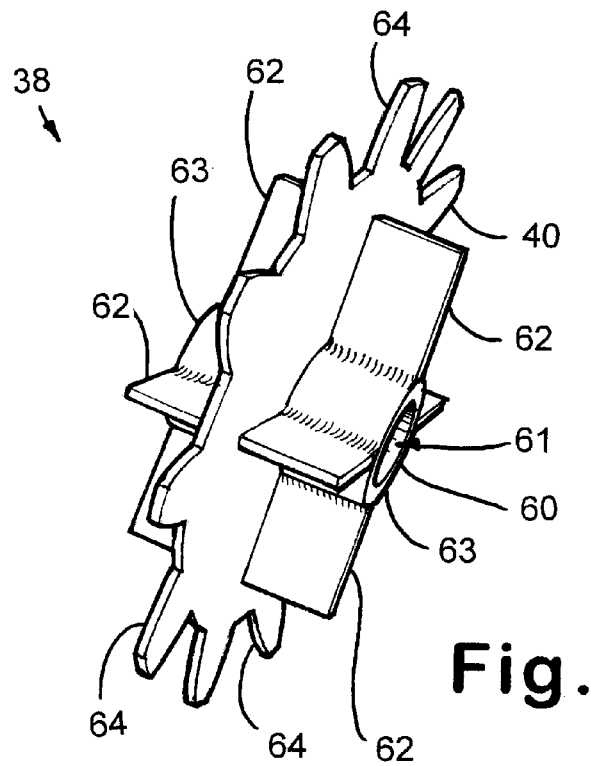
FIG. 5 is a perspective view of an impeller according to the preferred embodiment incorporating socket for driving the impeller.
Figure 6:
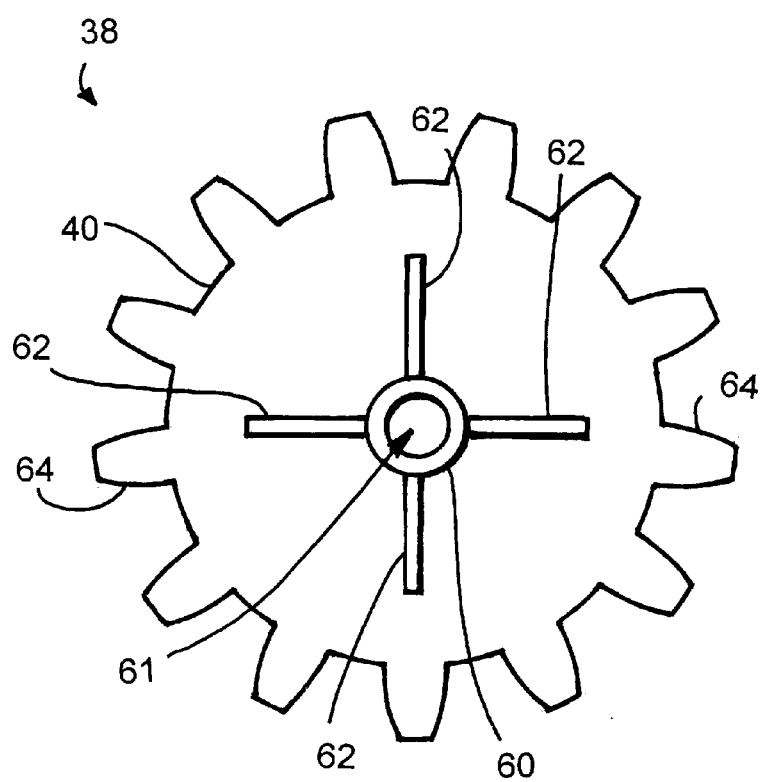
FIG. 6 is a side view of the impeller shown in FIG. 5.

Referring to FIGS. 5 and 6, an impeller 38 according to the preferred embodiment is shown. Impeller 38 has a cylindrical hub 60 having central bore 61 which is sized so that hub 60 is sleeved over shaft 52 and is rotatable thereon thereon about horizontal axis 56. Sprocket 40 is located on hub 60 substantially equi-distant from hub ends 63 and is coaxial with hub 60. Sprocket 40 has a plurality of teeth 64 about its periphery, and the spacing between adjacent teeth 64 substantially corresponds to the spacing of adjacent conveyor links 15 of conveyor 14. A plurality of blades or paddles 62 extend radially from an exterior surface of cylindrical hub 60 and are also orthogonal to the plane of sprocket 40 such that paddles 62 are oriented transversely to the direction of rotation when impeller 38 rotates about the longitudinal axis of hub 60. Paddles 62 are positioned on both faces of sprocket 40 such that laterally adjacent paddles 62 and sprocket 40 extend the length of hub 60.

Referring again to FIGS. 3 and 4, shaft 52 is positioned in substantially vertical alignment with the fixed edge 33 of shield 32 which defines one end of discharge opening 34. Impeller 38 is rotatably mounted on shaft 52 by sleeving hub 60 over shaft 52. Shaft 52 is vertically spaced above shield 32 such that when impeller 38 is mounted to shaft 52, sprocket 40 extends into trough section 26 through slots 42 and 48 of adjustable gate 35 and shield 32, respectively. So mounted, each paddle 62 of impeller 38 when rotated to a downwardly depending vertical position extends from hub 60 to shield 32 and substantially in registration with fixed edge 33.

In operation and referring to FIG. 3, adjustable gate 35 is fixed in a desired position to define a desired discharge opening 34 and to position free edge 39 of adjustable gate 35 in a desired vertically spaced relationship above conveyor 14 in trough section 26. The desired size of discharge opening 34 and its corresponding vertical height above conveyor 14 is determined by the granular size and flow characteristics of feed 17 and by the maximum desired depth of feed to be conveyed away from bin 24 by conveyor 14.

Bulk feed is introduced through top 30 of hopper bin 24 and is generally directed by gravity to discharge opening 34 and flows therethrough into trough section 26 for distribution by conveyor 14 to feeding stations 16 (FIG. 1) along automated feed distribution apparatus 10. Conveyor 14 is separately powered and traverses through trough section 26 from right to left as shown, but is reconfigurable to move in reverse fashion by exchanging locations of adjustable gate 35 to right side 28 and shield 32 to left side 27. As conveyor 14 moves from right to left, individual teeth 64 of sprocket 40 are engaged by individual links 15 of conveyor 14 thereby causing sprocket 40 to rotate and drive impeller 38 in a clockwise direction. Since gravity operates to direct the feed downward and into trough section 26 through discharge opening 34 where, if not attenuated, the feed tends to compact and be forced through discharge opening 34. As paddles 62 of impeller 38 rotate clockwise about shaft 52, the lower blade most proximate to discharge opening 34 operates to displace feed which is above discharge opening 34 to the left and upwardly therefrom. The clockwise rotation of impeller paddles 62 sweeping the feed to the left and upwardly away from discharge opening 34 reduces the gravitational force exerted upon the feed at discharge opening 34. The compacting of feed into trough section 26 is prevented, and the free flow of feed through discharge opening 34 for distribution throughout feed distribution apparatus 10 by conveyor 14 is facilitated. Additionally, as feed is continuously distributed along apparatus 10, not all feed will be consumed or deposited in feeding stations 16 and eventually feed will be returned to trough section 26 by conveyor 14. The return of feed to trough section 26 and the continued unregulated flow of feed through discharge opening 34 causes distribution system 10 to be overfilled thereby causing a potential blockage or a corresponding loss of feed. Free edge 39 by reason of its adjustability in correlation with gate 35 functions to regulate the depth of the feed carried through distribution system 10 by conveyor 14. As conveyor 14 traverses from right to left to carry feed 17, free edge 39 and ramped leg 37 directs excess feed 17 back into bin 24. The return of feed 17 from conveyor 14 is assisted by the clockwise rotation of impeller 38 and paddles 62 sweeping feed 17 away from discharge opening 34. The rotation of impeller 38 and sprocket 40 also agitate feed 17 at the bottom of bin 24 thereby preventing the compacting of the feed by the weight of feed above impeller 38.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A continuously operating distribution hopper for continuously supplying feed to an automated feed distribution apparatus of the type having a continuous conveyor which movably traverses through a trough housing, said hopper comprising:

a hopper bin for receiving a supply of feed to be distributed, said bin defining a feed discharge opening in a bottom of said hopper bin and further shaped to direct the supplied feed to said feed discharge opening for delivery of the feed to the feed distribution apparatus;

an impeller rotatably mounted within said hopper bin wherein only an upwardly rotating portion of said impeller is positioned over said discharge opening, said impeller including a plurality of transversely mounted paddles, a plane of each said paddle substantially perpendicular to the direction of rotation of said impeller; and a drive to rotate said impeller about an axis of rotation in a manner such that said impeller operates to displace feed away from said discharge opening for the prevention of feed compacting in the trough housing and said hopper bin.

2. The distribution hopper as set forth in claim 1 wherein said impeller is rotatably mounted to a side of said hopper bin.

3. The distribution hopper as set forth in claim 2 wherein said impeller rotates about a horizontal axis.

4. The distribution hopper as set forth in claim 3 wherein said horizontal axis is substantially in vertical alignment with an edge of said bottom, said bottom edge also defining a portion of said discharge opening.

5. The distribution hopper as set forth in claim 4 wherein each of said plurality of paddles is substantially planar.

6. The distribution hopper as set forth in claim 5 wherein said horizontal axis of rotation lies substantially parallel to a plane defined by each of said paddles.

7. The distribution hopper as set forth in claim 6 wherein said drive and said impeller are substantially coaxial.

8. The distribution hopper as set forth in claim 7 wherein each of said plurality of paddles is affixed to a face of said drive.

9. The distribution hopper as set forth in claim 1 wherein said drive is a sprocket having a plurality of teeth about a periphery of said sprocket, said teeth constructed to engage the feed conveyor such that said impeller rotates whenever the feed conveyor moves through said trough.

10. The distribution hopper as set forth in claim 9 wherein said sprocket and said impeller are substantially coaxial.

11. The distribution hopper as set forth in claim 10 wherein said hopper further comprises a gate having a leg and an edge of said leg defining at least a portion of said discharge opening.

12. The distribution hopper as set forth in claim 11 wherein said gate is adjustable to adjust the size of said discharge opening.

13. The distribution hopper as set forth in claim 12 wherein said gate edge extends below said hopper.

14. The distribution hopper as set forth in claim 13 wherein said gate leg in combination with said impeller remove excess feed from the conveyor when the conveyor is operating and said impeller is rotating.

15. The distribution hopper as set forth in claim 14 wherein said hopper is constructed to attach to the trough housing.

16. A continuously operating distribution hopper for continuously supplying feed to an automated feed distribution apparatus of the type having a continuous conveyor which movably traverses through a trough housing, said hopper comprising:

a hopper bin for receiving a supply of feed to be distributed, said bin defining a feed discharge opening in a bottom of said hopper bin and further shaped to direct the supplied feed to said feed discharge opening for delivery of the feed to the feed distribution apparatus;

an impeller rotatably mounted within and to a side of said hopper bin proximate to said discharge opening, said impeller including a plurality of transversely mounted planar paddles; and a drive coaxial with said impeller and having at least one of said planar paddles mounted to each of opposite sides of said drive, said drive to rotate said impeller about a horizontal axis in vertical alignment with an edge of said bottom and parallel to each of said planar paddles said bottom edge also defining a portion of said discharge opening, and said impeller rotatable in a manner such that said impeller operates to displace feed away from said discharge opening for the prevention of feed compacting in the trough housing and said hopper.

17. The distribution hopper as set forth in claim 16 wherein said drive is a sprocket having a plurality of teeth about a periphery of said sprocket, said teeth constructed to engage the feed conveyor such that said impeller rotates whenever the feed conveyor moves through the trough.

18. The distribution hopper as set forth in claim 17 wherein said hopper further comprises a gate having a leg and an edge of said leg defining at least a portion of said discharge opening.

19. The distribution hopper as set forth in claim 18 wherein said gate is adjustable to adjust the size of said discharge opening.

20. The distribution hopper as set forth in claim 19 wherein said gate edge extends below said hopper.

21. The distribution hopper as set forth in claim 20 wherein said gate leg in combination with said impeller remove excess feed from the conveyor when the conveyor is operating and said impeller is rotating.

22. The distribution hopper as set forth in claim 21 wherein said hopper is constructed to attach to the trough housing.

23. A continuously operating distribution hopper for continuously supplying feed to an automated feed distribution apparatus of the type having a continuous conveyor which movably traverses through a trough housing, said hopper comprising:

a hopper bin having a plurality of sides wherein bottoms of said sides define an open bottom, said sides shaped to direct feed supplied to said bin to said open bottom;

a shield attached to a first of said sides wherein said shield has a leg partially blocking a first portion of said open bottom;

a gate attached to a second of said sides wherein said gate has a leg partially blocking a second portion of said open bottom, and edges of said shield leg and said gate leg defining with bottoms of remaining said sides a feed discharge opening; and an impeller rotatably mounted within said hopper bin wherein only an upwardly rotating portion of said impeller is positioned over said discharge opening, said impeller including a plurality of transversely mounted paddles, a plane of each said paddle substantially perpendicular to the direction of rotation of said impeller.

24. The distribution hopper as set forth in claim 23 wherein said gate is adjustable to vary said feed discharge opening.

25. The distribution hopper as set forth in claim 24 wherein said gate edge extends below said hopper and said gate leg is not coplanar with said open bottom.

26. A continuously operating distribution hopper for continuously supplying feed to an automated feed distribution apparatus of the type having a continuous conveyor which movably traverses through a trough housing, said hopper comprising:

a hopper bin having a plurality of sides wherein bottoms of said sides define an open bottom, said sides shaped to direct feed supplied to said bin to said open bottom;

a shield attached to a first of said sides wherein said shield has a leg partially blocking a first portion of said open bottom;

a gate attached to a second of said sides wherein said gate has a leg partially blocking a second portion of said open bottom, and edges of said shield leg and said gate leg defining with bottoms of remaining said sides a feed discharge opening, said gate adjustable to vary said discharge opening, and further wherein said gate edge extends below said hopper and is not coplanar with said open bottom; and an impeller rotatable mounted within said hopper bin proximate to said discharge opening, said impeller including a plurality of transversely mounted paddles wherein said gate leg in combination with said impeller remove excess feed from the conveyor when the conveyor is operating and said impeller is rotating.

* * * * *